United States Patent
Oddsen, Jr.

(10) Patent No.: US 6,955,328 B2
(45) Date of Patent: Oct. 18, 2005

(54) ARM APPARATUS FOR MOUNTING ELECTRONIC DEVICES

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 10/305,510

(22) Filed: Nov. 27, 2002

(65) Prior Publication Data

US 2003/0075654 A1 Apr. 24, 2003

Related U.S. Application Data

(62) Division of application No. 10/166,419, filed on Jun. 10, 2002, now Pat. No. 6,854,698, which is a continuation of application No. 09/405,628, filed on Sep. 24, 1999, now Pat. No. 6,478,274.

(60) Provisional application No. 60/133,378, filed on May 10, 1999.

(51) Int. Cl.[7] .................................................. E04G 3/00
(52) U.S. Cl. .............................. 248/282.1; 248/289.11; 403/300; 403/306
(58) Field of Search ................................ 403/301, 302, 403/306, 310, 311, 313, 59, 62, 264, 72, 300, 292; 248/282.1, 276.1, 289.11, 289.31, 917, 919, 920, 122.1, 125.7, 278.1, 291.1

(56) References Cited

U.S. PATENT DOCUMENTS

| | | |
|---|---|---|
| 999,283 A | 8/1911 | White |
| 3,131,900 A | 5/1964 | Anderson et al. |
| 3,424,419 A | 1/1969 | Siegel |
| 3,489,383 A | 1/1970 | Anson |
| 4,266,747 A | 5/1981 | Souder, Jr. et al. |
| 4,494,177 A | 1/1985 | Matthews |
| 4,687,167 A | 8/1987 | Skalka et al. |
| 4,695,024 A | 9/1987 | Haven |
| 4,708,312 A | 11/1987 | Rohr |
| 4,768,744 A | 9/1988 | Leeds |
| 4,770,384 A | 9/1988 | Kuwazima et al. |
| 4,821,159 A | 4/1989 | Pike |
| 4,852,500 A | 8/1989 | Ryburg et al. |
| 4,852,842 A | 8/1989 | O'Neill |
| 5,123,621 A | 6/1992 | Gates |
| 5,174,531 A | 12/1992 | Perakis |
| 5,390,685 A | 2/1995 | McCoy |
| 5,437,427 A | 8/1995 | Johnson |
| 5,584,596 A | 12/1996 | Greene |
| 5,642,819 A | 7/1997 | Ronia |
| 5,664,750 A | 9/1997 | Cohen |
| 5,743,503 A | 4/1998 | Voeller et al. |
| 5,876,008 A * | 3/1999 | Sweere et al. ............... 248/325 |
| 6,012,693 A * | 1/2000 | Voeller et al. ......... 248/280.11 |
| 6,076,785 A | 6/2000 | Oddsen, Jr. |
| 6,179,263 B1 | 1/2001 | Rosen et al. |

* cited by examiner

Primary Examiner—Gwendolyn Baxter
(74) Attorney, Agent, or Firm—Lerner, David, Littenberg, Krumholz & Mentlik, LLP

(57) ABSTRACT

An extension arm suitable for mounting a flat-screen electronic peripheral device, including a forearm extension having at one end a first coupling for attachment to a tilter, a platform or other means for supporting a flat-screen device and at the other end a second coupling. The extension arm also includes a pair of end caps, each having a shaft. The shaft of the first end cap is pivotably rotatable in a support mount, such as a wall, desk or pole mount. The shaft of the second end cap is pivotably rotatable in the second coupling of the forearm extension. The extension arm also includes an upper channel and a lower channel. Each channel has at opposite ends a pair of integrally cast rollers which are pivotably attached to each of the end caps. The upper and lower channels and the end caps form an adjustable parallelogram.

19 Claims, 8 Drawing Sheets

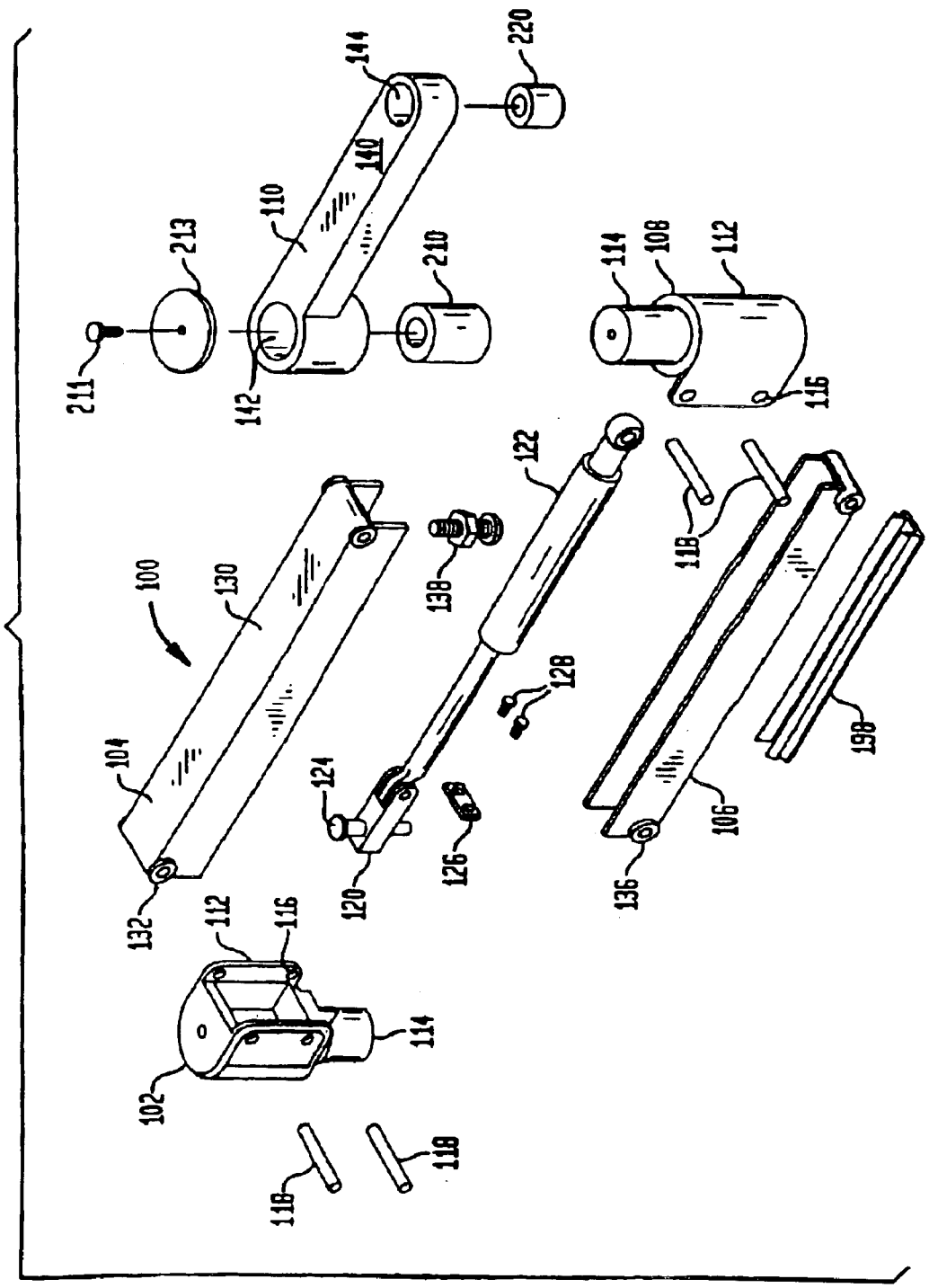

ARM APPARATUS FOR MOUNTING ELECTRONIC DEVICES

REFERENCE TO CROSS-RELATED APPLICATIONS

The present application is a divisional of application Ser. No. 10/166,419, filed Jun. 10, 2002 now U.S. Pat. No. 6,854,698, is a continuation of application Ser. No. 09/405,628, filed Sep. 24, 1999, now U.S. Pat. No. 6,478,274, which claims the benefit of Application No. 60/133,378, filed on May 10, 1999, all of which are entitled "Arm Apparatus for Mounting Electronic Devices", the disclosures of which are incorporated herein by reference.

BACKGROUND OF THE INVENTION

This invention relates to an arm apparatus for mounting electronic devices and a method for manufacturing the arm apparatus, and more specifically to an extension arm suitable to mount a flat-screened electronic peripheral device, such as a computer monitor or television and the method for manufacturing the extension arm.

Adjustable extension arms for mounting electronic peripheral devices, such as a computer monitor or a television, are well known in the prior art. However, due to recent advances in flat-screen technology, there is a demand for adjustable extension arms that are particularly suited for use with flat-screen devices, such as flat screen computer monitors and televisions.

FIGS. 1–7 are assembly drawings of an extension arm 10 for mounting a peripheral device, in accordance with the prior art. As shown in FIG. 1, the main elements of the extension arm 10 are a first end cap 12, an upper channel 14, a lower channel 16, a second end cap 18, and a forearm extension 20. The first end cap 12 has an end cap shaft 22 that is pivotably attachable to a rigid support mount (not shown), such as an orifice sized to accept the end cap shaft 22 or a track configured and sized to engage the grooves on end cap shaft 22. The first end cap 12 is pivotably coupled via pins 24 to both the upper channel 14 and the lower channel 16. The opposite ends of the upper channel 14 and the lower channel 16 are pivotably coupled via pins 24 to the second end cap 18. The second end cap 18 is coupled to the forearm extension 20 via a forearm extension pin 92. The forearm extension 20 has a vertically disposed hole 26 therethrough for accepting a device mount (not shown) such as a tilter, platform or other apparatus. The combination of the upper and the lower channels 14, 16 and the first and the second end caps 12, 18 form an adjustable parallelogram that permits a device coupled to the forearm extension 20 to be raised and lowered to a desirable height. The parallelogram retains its position by employing a gas spring 28, which is pivotably and adjustably attached to the first end cap 12 and the upper channel 14, as will be further described below. Generally, the gas spring 28 is sized so as to have a fixed length until an upward or downward force is exerted at the second end cap 18 that exceeds the gas spring's designed resistance. Thus, the gas spring 28 causes the parallelogram to retain its position when the only force exerted at the second end cap 18 is the weight of the device, but permits the parallelogram to be adjusted when a user pushes the device coupled to the forearm extension 20 up or down.

FIG. 2 illustrates a side view of the first end cap 12, having the end cap shaft 22 disposed on a first end 30 of the first end cap 12. To provide a rigid connection between the two pieces, the end cap shaft 22 is typically machined from steel and is inserted into the first end 30 during the casting process of the first end cap 12. The end cap shaft 22 has a hole 32 formed in an end of the end cap shaft 22 that is inserted into the first end cap 12. The first end cap 12 is typically fabricated from cast aluminum. The first end cap 12 also has a second end 34 having a hole 36 disposed therethrough. Disposed within the first end cap 12 is a threaded rod 38. A first end 40 of the threaded rod 38 is inserted into the hole 32 at the base of the end cap shaft 22. A second end 42 of the threaded rod 38 is aligned with the hole 36 and is held in place by a clip 44. The clip 44 is fastened to an inner surface of the first end cap 12 by screws 46.

Threadedly mounted on the threaded rod 38 is a clevis 48. FIG. 3 illustrates a sideview of the clevis 48 including a tapped hole 50 in the center thereof. The tapped hole 50 receives the threaded rod 38, as shown in FIG. 2. At a first end of the clevis 48 is a pair of fastening members 52, 54 to which are fastened one end of the gas spring 28. A second end 56 of the clevis 48 is configured to slidably engage a track 58 which is integrally molded in the first end cap 12 (see FIG. 2). The second end 42 of the threaded rod 38 is configured to be engaged by a hex-shaped key which is inserted through the hole 36 when the second end 42 is properly aligned with the hole 36. The hex-shaped key is employed so as to rotate the threaded rod 38 along its axis of rotation. When the threaded rod 38 is rotated along its axis of rotation, the clevis 48 moves along the length of the threaded rod 38 in a direction that corresponds to the direction which the hex-shaped key is turned. This movement of the clevis 48 permits the gas spring 28 to be adjusted.

FIGS. 4(a) and 4(b) illustrate the upper channel 14, which comprises channel bottom 60 from which extend two channel sidewalls 62. Channel bottom 60 and sidewalls 62 are typically stamped from 13 gauge steel sheet in order to give the upper channel 14 a desired degree of structural rigidity. At each of the ends of the channel bottom 60, a semi-circular region 64 of the sidewalls 62 is cut out to accommodate cold-rolled steel rollers 66, which have a hole 68 therethrough for receiving the pins 24. The rollers 66 are rigidly attached to the upper channel 14 by MIG welding along the edge of the semi-circular cut out region 64 and along the ends of the channel bottom 60.

Additionally, the upper channel 14 comprises stiffener 70, which is welded to an inner surface of the channel bottom 60. Besides providing additional structural rigidity to the upper channel 14, the stiffener 70 has a hole disposed at one end with a threaded ball stud 72 placed within the hole and fixed in place by a nut 74. The ball stud 72 is configured and sized to receive one end of the gas spring 28. The longitudinal centerline 76 of the upper channel 14 is illustrated in FIG. 4(b).

FIGS. 5(a) and 5(b) illustrate the lower channel 16 which comprises a channel bottom 78 from which extend two channel sidewalls 80. As with the upper channel 14, the channel bottom 78 and sidewalls 80 are typically stamped from 13 gauge steel sheet, which is relatively heavy in order to give the lower channel 16 a desired degree of structural rigidity. At opposite ends of the channel bottom 78, a semi-circular region 82 of the sidewalls 80 is cut out to accommodate cold-rolled steel rollers 84, which have a hole 86 therethrough for receiving the pins 24. The rollers 84 are rigidly attached to the lower channel 16 by MIG welding along the edge of the semi-circular cut out region 82 and along the ends of the channel bottom 78. The longitudinal centerline 88 of the lower channel 16 is illustrated on FIG. 5(b)

FIG. 6 illustrates the second end cap 18. Unlike the first end cap 12, the second end cap 18 does not have an end cap shaft, nor does it have a clevis assembly for attachment to the gas spring 28. Instead, the second end cap 18 has a hole 90 disposed in a bottom end for receiving the forearm extension pin 92, and a hole 94 in a side for inserting a pin 96 into the forearm extension pin 92, as illustrated in FIG. 1.

FIG. 7 illustrates the forearm extension 20 having the forearm extension pin 92 welded thereto. The forearm extension pin 92 has a hole 98 formed in an upper end to receive the pin 96. The forearm extension 20 is configured to be pivoted around the forearm extension pin 92, and is held in place within the second end cap 18 by the pin 96 which penetrates the hole 94 of the second end cap 18 and the hole 98 of the forearm extension pin 92.

Extension arms 10 of the prior art, such as the one shown in FIGS. 1–7 and others like it, are ill-suited for flat-screen monitors and televisions, in that they are bulky and cumbersome. In addition, due to the configuration of its various parts, extension arms 10 of the prior art cannot be flattened against a mounting surface so that the entire extension arm 10 is hidden behind the flat screen device when the device is substantially flush with the mounting surface. Additionally, the extension arms 10 of the prior art are costly to manufacture and difficult to assemble.

Thus, there is a need for an extension arm suitable to mount a flat-screened electronic peripheral device, such as a computer monitor or television, that is inexpensive and easy to manufacture and assemble, and that permits a flat-screen device to be mounted substantially flush with the mounting surface.

SUMMARY OF THE INVENTION

The present invention, in accordance with one embodiment, relates to an extension arm suitable for mounting a flat-screened electronic peripheral device, such as a computer monitor or television. The extension arm is inexpensive and easy to manufacture and assemble, and permits a flat-screen device to be mounted substantially flush with a mounting surface.

According to one embodiment, the extension arm comprises a forearm extension that has at one end a first coupling for attachment to a tilter, a platform or other means for supporting a flat-screen device. At the other end of the forearm extension is a second coupling. The extension arm also comprises a pair of end caps each having an end cap shaft. The end cap shaft of the first end cap is pivotably rotatable in a support mount, such as a wall, desk or pole mount. The end cap shaft of the second end cap is pivotable rotatable in the second coupling of the forearm extension.

The extension arm also comprises an upper channel and a lower channel. The upper channel has at opposite ends a pair of integrally cast rollers. Each roller is pivotably attached to each of the end caps. The lower channel also has at opposite ends a pair of integrally cast rollers, which are pivotably attached to each end cap. The upper and lower channels and the end caps form an adjustable parallelogram. The shape of the parallelogram is retained by a gas spring. One end of the gas spring is attached to a ball stud mounted in the upper channel. The other end of the gas spring is adjustably mounted to the first end cap.

The extension arm also comprises a clevis, which is located within the first end cap. The clevis is pivotably attached to the end of the gas spring which is mounted in the first end cap. A threaded rod threadedly engages the clevis, such that the clevis slides within the first end cap when the rod rotates around its axial centerline. The threaded rod is rotatably secured within the first end cap by a retainer clip and a pair of screws.

In one embodiment of the present invention, an upper channel for use in an extension arm that adjustably mounts a device to a support mount, the upper channel comprising a U-shaped body having first and second ends, the body including a pair of spaced apart sidewalls and a bottom wall, a first roller at a first end of the body and a second roller at a second end of the body, the first roller including a pair of spaced apart roller walls extending between the sidewalls from the bottom wall, the height of the roller walls from the bottom wall being less than the height of another portion of the first roller from the bottom wall.

In another embodiment of the present invention, a lower channel for use in an extension arm that adjustably mounts a device to a support mount, the lower channel comprising a U-shaped body having first and second ends, the body including a pair of spaced apart sidewalls and a bottom wall, a first roller at a first end of the body and a second roller at a second end of the body, the first roller including a pair of spaced apart roller walls extending between the sidewalls from the bottom wall, the height of the roller walls from the bottom wall being less than the height of the remaining portion of the first roller from the bottom wall.

In another embodiment of the present invention, the combination of an upper channel and a lower channel for use in an extension arm that adjustably mounts a device to a supporting mount, the combination comprising an upper channel including a U-shaped upper body having first and second ends, the upper body including a pair of spaced apart sidewalls and a bottom wall, a first roller at a first end of the upper body and a second roller at a second end of the upper body, the first roller including a pair of spaced apart roller walls extending between the sidewalls from the bottom wall, the height of the roller walls from the bottom wall being less than the height of the remaining portion of the first roller from the bottom wall; and a lower channel including a U-shaped lower body having first and second ends, the lower body including a pair of spaced apart sidewalls and a bottom wall, a third roller at a first end of the lower body and a fourth roller at a second end of the body, the third roller including a pair of spaced apart roller walls extending between the sidewalls from the bottom wall, the height of the roller walls from the bottom wall being less to the height of the remaining portion of the third roller from the bottom wall, wherein the upper and lower body and the respective rollers are integrally cast.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 8 is an exploded assembly drawing of an extension arm for adjustably mounting a flat-screen device to a support mount, according to one embodiment of the invention;

DETAILED DESCRIPTION

Figure 1:
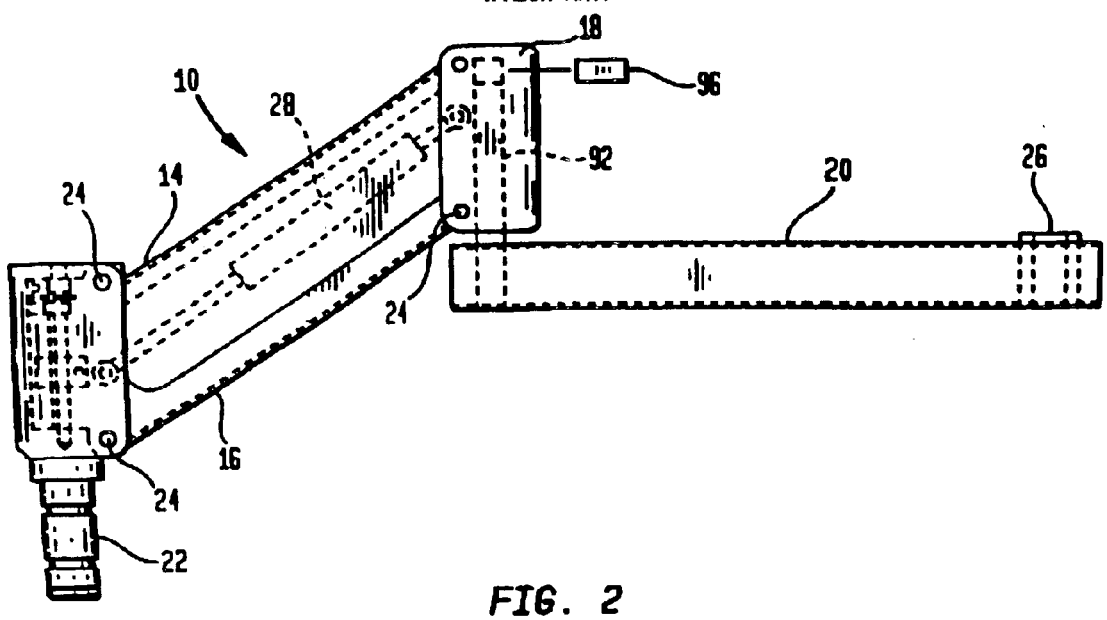
FIG. 1 is an assembly drawing of an extension arm for mounting a computer monitor, in accordance with the prior art.

The present invention, in accordance with one embodiment, relates to an extension arm suitable for mounting a flat-screen electronic peripheral device, such as a computer monitor or television, and the method of manufacturing the extension arm. FIG. 8 is an exploded assembly drawing of the extension arm, for adjustably mounting a device to a support mount, according to one embodiment of the invention.

In the embodiment shown, the extension arm 100 comprises a first end cap 102, an upper channel 104, a lower channel 106, a second end cap 108, and a forearm extension 110. The first end cap 102 and the second end cap 108 both include a partially enclosed housing 112 and a shaft 114. The partially enclosed housing 112 of both the first and the second end caps 102, 108 is configured with, for example, holes 116 to receive a connection mechanism, such as a pin 118, therethrough. The shaft 114 of the first end cap 102 is configured to be inserted for pivotable rotation in a support mount (not shown), which may be a wall, a desk, a pole mount, or a configurable mount as shown and described in Applicant's co-pending patent applications: application No. 60/106,729 filed on Nov. 2, 1998 and application No. 60/108,469 filed on Nov. 14, 1998. The shaft 114 of the second end cap 108 is configured to be inserted for pivotable rotation in the forearm extension 110.

The partially enclosed housing 112 of the first end cap 102 also includes a clevis 120, which is pivotably attached to an end of a gas spring 122, mounted therein. A threaded rod 124 is in threaded engagement with the clevis 120, such that the clevis 120 is configured to slide within the first end cap 102 when the threaded rod 124 rotates on its axis. The threaded rod 124 is rotatably secured in the first end cap 102 by a retainer clip 126 that is attached to the first end cap 102 with, for example, screws 128.

The upper channel 104 includes a U-shaped body 130 and integrally cast rollers 132 disposed at opposite ends of the U-shaped body 130. Each of the rollers 132 is configured to be pivotably attached to a respective one of the first end cap 102 and the second end cap 108 with, for example, the pins 118. The lower channel 106 also includes a U-shaped body 134 and integrally cast rollers 136 disposed at opposite ends of the U-shaped body 134. Each of the rollers 136 is configured to be pivotably attached to a respective one of the first end cap 102 and the second end cap 108 with, for example, the pins 118.

The upper and the lower channels 104, 106 and the first and the second end caps 102, 108 are configured so as to form an adjustable parallelogram. When configured, the shaft 114 of the first end cap 102 and the shaft 114 of the second end cap 108 point in opposite directions. For example, the shaft 114 of the first end cap 102 extends vertically downward while the shaft 114 of the second end cap 108 extends vertically upward. The shape of the parallelogram is retained by the gas spring 122. One end of the gas spring 122 is attached to a ball stud 138 which is mounted to the upper channel 104. The other end of the gas spring 122 is adjustably mounted to the clevis 120 within the first end cap 102. Generally, the gas spring 122 is sized so as to have a fixed length until an upward or downward force is exerted at the second end cap 108 that exceeds the gas spring's designed resistance. Thus, the gas spring 122 retains the parallelogram shape when the only force exerted at the second end cap 108 is the weight of the flat-screen device. However, the gas spring 122 permits the parallelogram shape to be adjusted when a user pushes the flat-screen device coupled to the forearm extension 110 up or down.

The forearm extension 110 includes a body 140 having a first female coupling 142 located on a first end and a second female coupling 144 located on a second end. The first female coupling 142 is for attachment to the shaft 114 of the second end cap 108. The second female coupling 144 is for attachment to a device mounting (not shown) such as a tilter, as described in Applicant's co-pending patent application No. 60/137,088 filed on Jun. 2, 1999; a platform or other means for supporting a flat-screen device.

Additional advantages and features of the individual components, according to various embodiments of the present invention, are further described below.

End Caps 102, 108

Figure 9A:
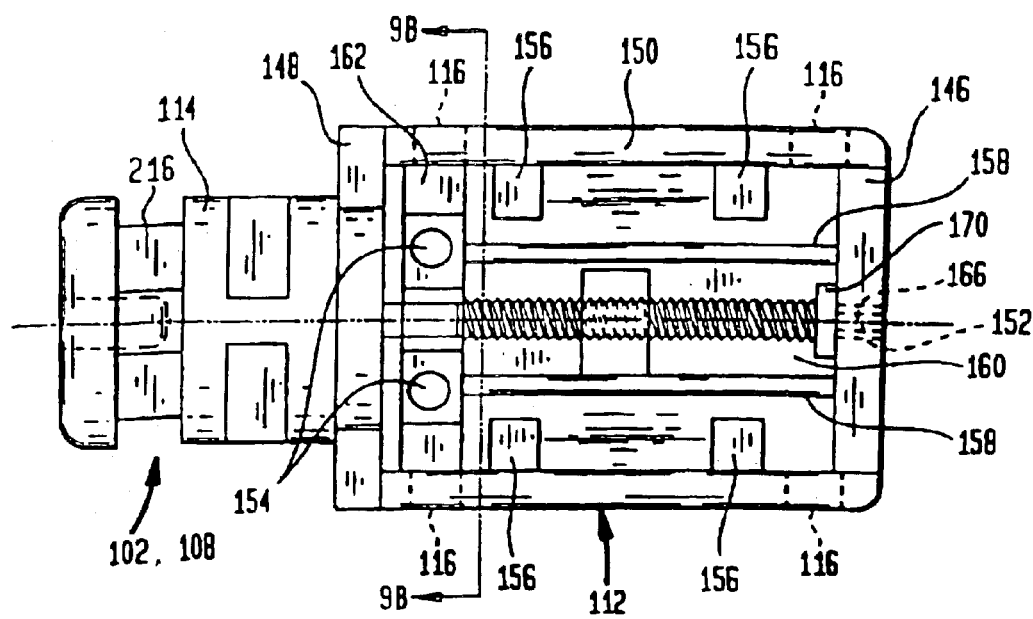
FIGS. 9(a)–(d) show several views of end caps, in accordance with one embodiment of the invention.
Figure 9B:
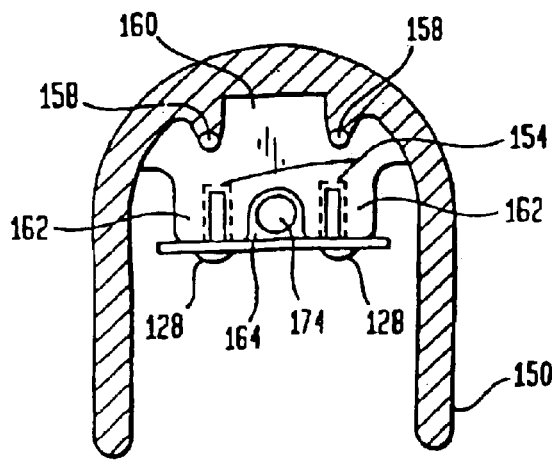

FIG. 9(a) illustrates a side view, and FIG. 9(b) illustrates a top view of the first end cap 102 and the second end cap 108, in accordance with one embodiment of the invention. In the embodiment shown, each of the first and second end caps 102, 108 includes the partially-enclosed housing 112 which has flat, oppositely-disposed endwalls 146 and 148 fixedly connected by a sidewall 150. The sidewall 150 extends partially around the partially-enclosed housing 112 so as to permit manipulation of components to be assembled within the first and second end caps 102, 108. In one embodiment, the endwalls 146 and 148 are semi-circular in shape and are connected along a semi-circular edge to the sidewall 150, which extends perpendicularly therebetween.

FIG. 9(a) is a side view (from the perspective of the open region of the sidewall 150), that illustrates the first and the second end caps 102, 108 having the shaft 114 disposed on the endwall 148. The shaft 114 is preferably integrally molded to the endwall 148 of each of the end caps 102, 108. Preferably the entire end caps 102, 108 (partially enclosed housings 112 and shafts 114) are molded from zinc. The endwall 146 has a hole 152 disposed therethrough. Within the partially enclosed housing 112 and integrally molded on the sidewall 150 adjacent the endwalls 146, 148 are first and second pair of spaced apart projections such as stops 156. The stops 156 serve to stop upward or downward movement of the extension arm 100 when ends of the lower channel 106 and the upper channel 104, respectively, meet the stops 156 when the extension arm 100 is in extended positions.

Also within the partially-enclosed housing 112, and integrally molded to the inner surface of the sidewall 150 are trough walls 158 which run longitudinally along the inner surface of the sidewall 150 between the endwalls 146 and 148 so as to define a trough 160 therebetween. FIG. 9(b) illustrates a side view of the trough 160 disposed between the trough walls 158.

Additionally within the partially enclosed housing 112 and integrally molded with the inner surface of the sidewall 150, and proximate the endwall 148, are shelves 162. FIG. 9(b) illustrates a side view of the shelves 162 which define co-planar faces separated by a groove 164. The shelves 162 have a connection means, such as self-tapping screw holes 154 disposed therein. The co-planar faces of the shelves 162 are configured to engage the retainer clip 126, which is fastened in place by, for example, the pair of screws 128. When the retainer clip 126 is fastened in place, the groove 164 defines a spacing for accepting one end of the threaded rod 124, as discussed below.

Figure 9C:
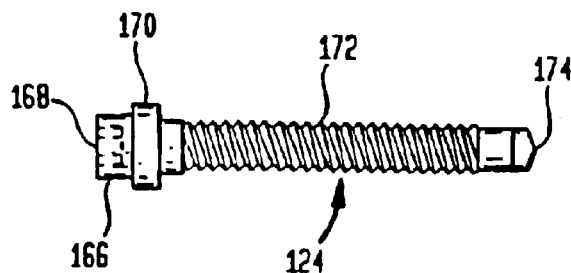

The first end cap 102 and the second end cap 108 are identical at this point. However, while the manufacturing of the second end cap 108 is complete, the first end cap 102 still requires assembly of the threaded rod 124 and the clevis 120. The threaded rod 124 is employed within the first end cap 102 so as to adjustably support the clevis 120. FIG. 9(c) illustrates the threaded rod 124 in greater detail. A first end 166 has a circular cross-section within which is axially disposed a shaped opening 168, for example a hex-shaped opening, for accepting a shaped key (not shown), such as a hex-shaped key. Advantageously, a cross-sectional diameter of the first end 166 is smaller than a cross-sectional diameter of the hole 152, so as to be inserted therein. Adjacent the first end 166 is a shoulder 170. Advantageously, the shoulder 170 has a circular cross-section having a diameter that is larger than the cross-sectional diameter of the hole 152. Thus, in the preferred embodiment, the shoulder 170 abuts an inner surface of the endwall 146 and retains the first end 166 within the hole 152.

The threaded rod 124 also includes a threaded section 172 which is configured to threadingly engage the clevis 120. The second end 174 of the threaded rod 124 is disposed in the groove 164 located between the shelves 162 of the first end cap 102. Preferably, the second end 174 of the threaded rod 124 has a circular cross-section having a diameter that is smaller than the size of the groove 164, such that the second end 174 is supported between the shelves 162 but is free to rotate therein.

Figure 9D:
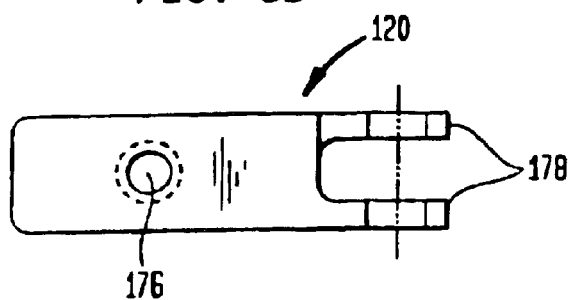

As previously mentioned, threadedly mounted on the threaded rod 124 is the clevis 120. The clevis 120 as illustrated in FIG. 9(d), has a tapped hole 176 formed therein for receiving the threaded rod 124. The clevis 120 also has a fastening member 178 at a first end, which is fastened to one end of the gas spring 122. The second end of the clevis 120 is configured to slidably engage the trough 160.

When the first end 166 of the threaded rod 124 is engaged by the shaped key, the shaped key is employed so as to rotate the threaded rod 124 around its axial centerline. When the threaded rod 124 is rotated around this axis of rotation, the clevis 120 moves along the length of the threaded rod 124 in a direction that corresponds to the direction which the hex-shaped key is turned. This movement of the clevis 120 permits the gas spring 122 to be adjusted.

The end caps 102, 108 have numerous manufacturing advantages over the end caps 12, 18 of the prior art, and others like it. Unlike the prior art end caps 12, 18 which are different from each other, the end caps 102, 108 are advantageously manufactured the same way. The threaded rod assembly 124 and the clevis 120 of the first end cap 102 are subsequently assembled in the first end cap 102. Thus, the cost of manufacturing two different kinds of end caps are eliminated.

Moreover, the cost of manufacturing each end cap 102, 108 is reduced significantly. In the prior art, a significant part of the cost of the first end cap 12 is the steel shaft 22, which is machined separately, and then is inserted into the aluminum cast mold. By contrast, the shaft 114 is integrally molded with the end caps 102, 108 by employing interlocking mold technology. Interlocking molds permit a near-perfect mold to be made, minimizing the machining that is required to insure that the shaft 114 is not out-of-round. By minimizing the amount of machining that is required to be performed on the shaft 114, the use of interlocking molds insures that the strength of the casting, which is primarily located in the skin of the cast, is maximized.

As previously mentioned, all the components of the end caps 102, 108 are preferably cast molded from zinc, though the present invention is not limited in scope in this respect. Using zinc for the partially enclosed housings 112 is an improvement over the aluminum end caps 12, 18 employed in the prior art. That is, the zinc is stronger and more flexible than the aluminum.

The first end cap 102 also has numerous assembly advantages over the first end cap 12 of the prior art, and others like it. For instance, the assembly time required to rotatably fasten the threaded rod 124 in the first end cap 102 is greatly reduced. In order to assemble the threaded rod 124 of the present invention, the first end 166 is inserted into the hole 152 until the shoulder 170 abuts the inner surface of the endwall 146. The second end 174 of the threaded rod 124 is then positioned in the groove 164 between the shelves 162. The second end 174 is held in place by the retainer clip 126 which is fastened in place by, for example, the screws 128, which are easily accessible due to their proximity above the threaded rod 124. The first end 166 of the threaded rod 124 is perfectly aligned with the hole 152, and will remain so, because it is inserted for rotation therein.

By contrast, the assembly of the threaded rod 38 in the first end cap 12 of the prior art is more complicated, and therefore, more costly. For example, the first end 40 is inserted into the hole 32 in the base of the end cap shaft 22. Next, the clevis 48 is mounted on the rod 38, and then the second end 42 is fastened inside the first end cap 12 by the clip 44. The clip 44 is also employed to align the second end 42 relative to the hole 36. Thus, the clip 44 must be fastened inside the first end cap 12 with precision, so as to insure that the second end 42 is aligned relative to the hole 36 such that the second end 42 can be engaged by a hex-shaped key which is inserted into the hole 36. Moreover, the screws 46 which are employed to the fasten clip 44 inside the first end cap 12 are difficult to access due to their position underneath the rod 38, thus complicating the process of aligning the second end 42 with the hole 36. In addition, the fastening of the clip 44 inside the first end cap 12 is also rendered more difficult because the clevis 48 is already attached to the gas spring 28.

Unlike the prior art, the current invention does not require a forearm extension pin 92 to connect the second end cap 18 to the forearm extension 20. Moreover, the pin 96 is not required to hold the forearm extension pin 92 within the second end cap 18. Instead, the current invention uses the shaft 114 of the second end cap 108 to connect the second end cap 108 to the forearm extension 110. Thus, manufacturing costs can be reduced since there in no need to manufacture the forearm extension pin 92 or the pin 96, and there is no reason to form the hole 94 within the second end cap 18 or the hole 98 within the forearm extension pin 92 to accept the pin 96.

Upper Channel 104

FIGS. 10a–d illustrate several views of the upper channel 104, according to one embodiment of the invention. The U-shaped body 130 of the upper channel 104 comprises a channel bottom 180 from which extend two channel sidewalls 182. Unlike the upper channel 14 of the prior art extension arm shown in FIGS. 4a–b, which is stamped from heavy gauge steel, the channel bottom 180 and the sidewall-S 182 of the upper channel 104 are preferably integrally cast from zinc, which gives the upper channel 104 a lesser weight, and a degree of structural rigidity, more suitable for lighter-weight flat screen devices. At each end of the channel bottom 180 are the rollers 132, which are also integrally cast. The rollers 132 have a hole 184 therethrough (either cast or subsequently drilled) for receiving a connection mechanism, such as the pins 118. Additionally, the upper channel 104 comprises a threaded hole 186 configured and sized to receive a threaded end of the ball stud 138. The threaded hole 186 is also integrally cast. The ball stud 138 is configured and sized to receive one end of the gas spring 122.

The upper channel 104 has numerous manufacturing advantages over the upper channel 14 of the prior art, and others like it. For instance, with reference to the upper channel 14 of the prior art shown in FIGS. 4a–b, the welding which is required to attach the rollers 66 to the upper channel 14 is difficult to perform. The axial centerlines of the rollers 66 must be near-perfectly parallel to each other, while being near-perfectly perpendicular to the longitudinal centerline 76 of the channel bottom 60. The tolerances for these angles are very small so as to insure that the lower channel 16 engages the upper channel 14 when the parallelogram is adjusted. These tolerances are very difficult to meet when the rollers 66 are welded to the upper channel 14. By contrast, the rollers 132 of the upper channel 104 of the present invention are integrally cast so as to insure that the axial centerlines of rollers 132 are simultaneously perfectly parallel to each other and perfectly perpendicular to a longitudinal centerline 188 of the channel bottom 180.

Figure 4A:
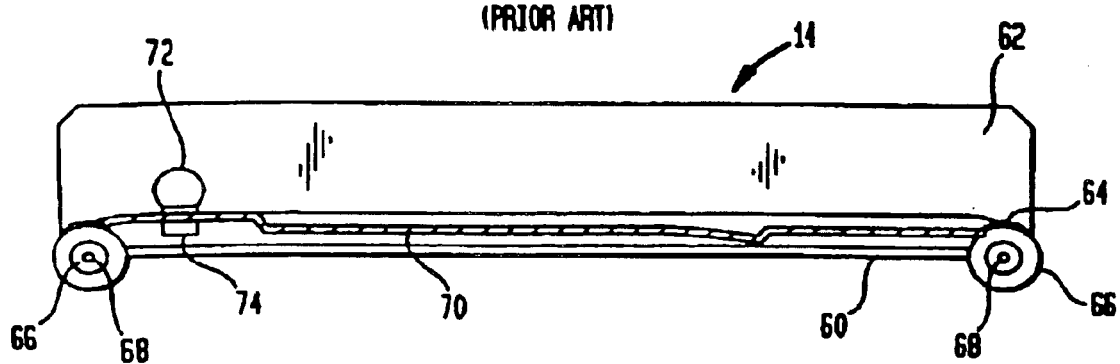
FIGS. 4(a) and 4(b) illustrate the upper channel of an extension arm, in accordance with the prior art.
Figure 4B:
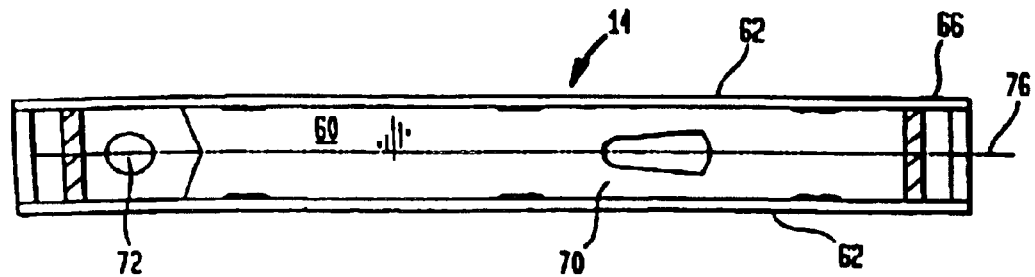

Additionally, with further reference to FIGS. 4a–b and as previously noted, due to the hardness of the steel employed for the prior art upper channel 14, the rollers 66 must be MIG welded thereto, which in turn requires the rollers 66 to be fabricated from expensive cold-rolled steel. Although it is tempting for a manufacturer of the rollers 66 to employ a cheaper material, such as leadloy, these cheaper materials do not provide a safe and consistent weld when joined to the steel upper channel 14. Typically, tests must be performed on the roller material to insure that leadloy has not been supplied. By contrast, the upper channel 104 of the present invention requires no welding, eliminating the cost of aligning the rollers, the cost of performing the welding and the cost of testing the rollers to determine if they are a suitable welding material.

In additional disadvantage of welding the rollers 66 to the upper channel 14 is that the heat produced by welding the rollers 66 to the upper channel 14 may cause the upper channel 14 to curl or deform. If this occurs, alignment of the rollers 66 is ruined and the upper channel 14 is rendered useless, requiring it to be discarded. By eliminating any welding required during the manufacture of the upper channel 104, the likelihood of heat-deforming the upper channel 2-04 is also eliminated and materials are not wasted.

As previously mentioned, the prior art upper channel 14 is made of steel, which means that the upper channel 14 is formed by heating a piece of steel and bending the steel to form the channel bottom 60 arid the sidewalls 62. Thus, precise manufacturing is required to ensure the sidewalls 62 extend up from the channel bottom 60 at 90 degree angles. If the angle is slightly off it will likely cause the upper channel 14 and the lower channel 16 to scrape against one another. The use of cast molding in the current invention ensures the angle between the channel bottom 180 and the sidewalls 182 is exactly the same each and every time. Thus, the likelihood of scraping is greatly reduced, if not eliminated.

Figure 10A:
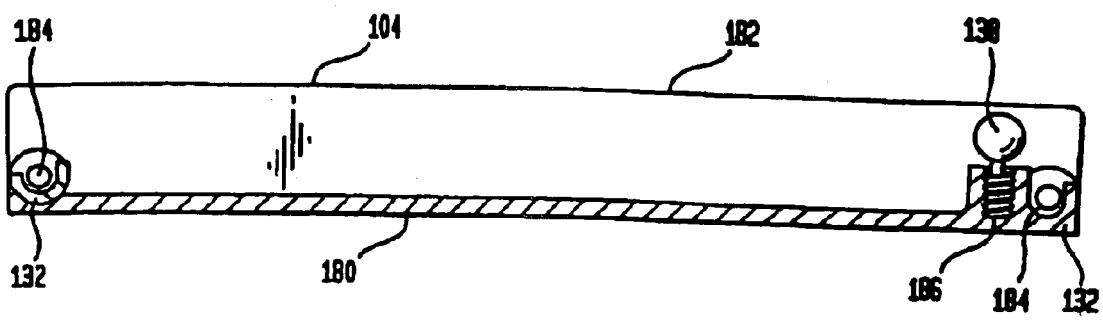
FIGS. 10(a)–(d) illustrate several views of an upper channel, according to one embodiment of the invention.
Figure 10B:
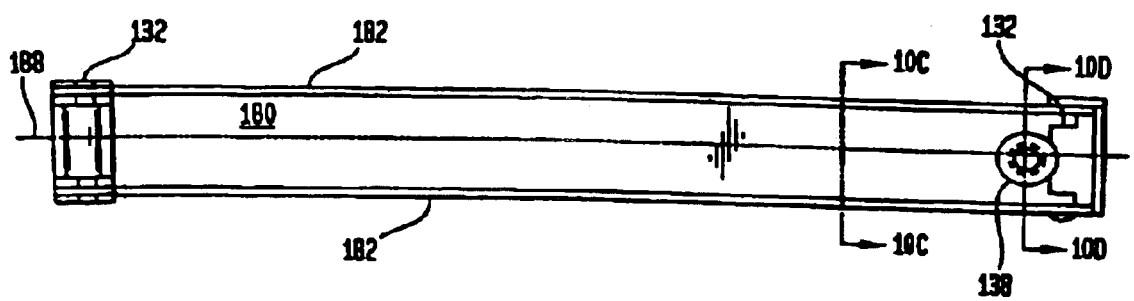
Figure 10C:
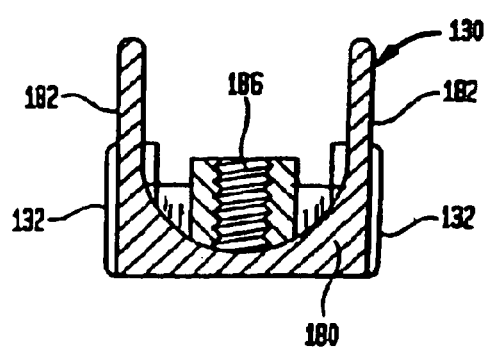
Figure 10D:
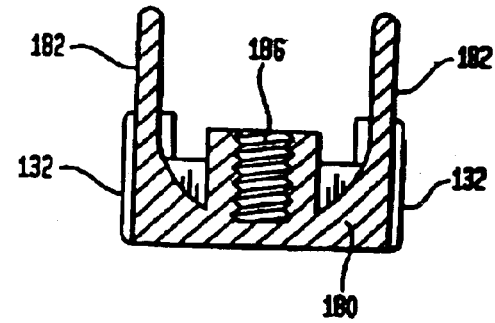

Moreover, as illustrated in FIGS. 10c and 10d, which are cross-sectional views of the upper channel 104, the sidewalls 182 are tapered. Both an outer surface and an inner surface of the sidewalls 180 tapers in approximately 1 degree. The taper is possible because the upper channel 104 is, in the preferred embodiment, cast molded. The taper provides several advantages including more clearance between the upper and the lower channels 104, 106 when the upper and the lower channels 104, 106 are brought together during usage. That is, the inner surface of the sidewall 180 being displaced by 1 degree means that there will be additional clearance for the lower channel 106 to fit therewithin. The additional clearance will help prevent the upper channel 104 and the lower channel 106 from scraping together. Thus, damage to the paint or other coating that may cover the upper and the lower channels 104, 106 will be further reduced, if not eliminated. Moreover, less material is needed at outer edges of the sidewalls 182. Furthermore, the taper is more aesthetically pleasing to the eye of the user.

Additionally, the upper channel 104 eliminates the requirement for the stiffener 70, which, with reference to FIGS. 4a–b, is welded to the inner surface of the channel bottom 60 in the upper channel 14 of the prior art. Unlike the upper channel 14 of the prior art, the upper channel 104 does not require the additional structural rigidity provided by the stiffener 70. By eliminating the stiffener 70, the upper channel 104 of the present invention also saves the steps required to weld the stiffener 70 to the channel bottom 60 which are required by the prior art upper channel 14.

Moreover, additional assembly steps are saved by integrally casting the threaded hole 186 in the upper channel 104 of the current invention. For instance, the prior art upper channel 14 has the threaded ball stud 72 penetrate a hole disposed in the stiffener 70 and is fixed in place by the nut 74. In order to install the bail~1 stud 72, it is required that the threaded end of ball, stud 72 be inserted through the hole in the stiffener 70 and be fixed in place by the nut 74 prior to the stiffener 70 being welded in place. No such assembly is required with the upper channel 104 of the present invention.

An additional problem experienced by prior art upper channels 14 is the need to mask openings, such as the holes 68 in the rollers 66 that receive the pins 28 therethrough, when the upper channel is painted or otherwise coated. Specifically, labor is required in order to insert masking material into the openings and then to remove the masking material after the paint has been applied. By contrast, the openings of the present invention are according to one embodiment, precision-drilled after an application of paint or other coatings, thus eliminating the expense of masking any openings.

Lower Channel 106

Figure 5A:
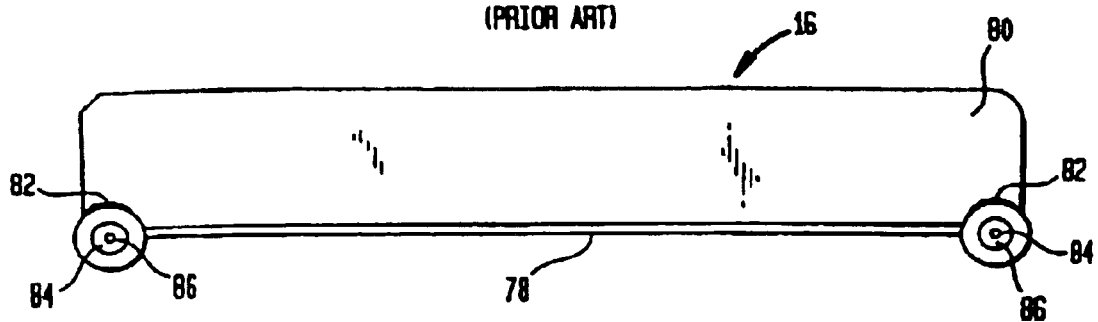
FIGS. 5(a) and 5(b) illustrate the lower channel of an extension arm, in accordance with the prior art.
Figure 5B:
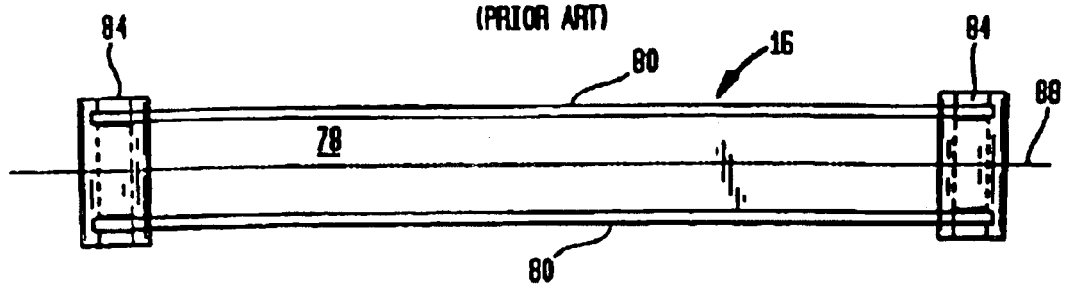
Figure 6:
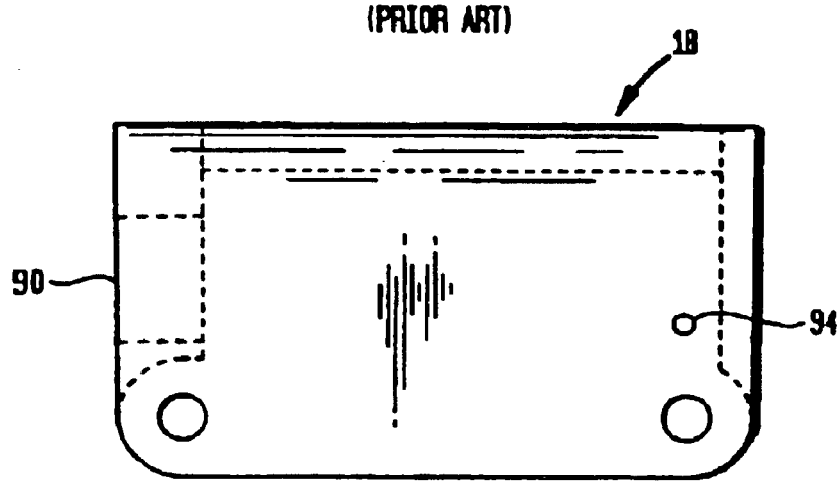
FIG. 6 illustrates a second end cap of an extension arm, in accordance with the prior art.
Figure 7:
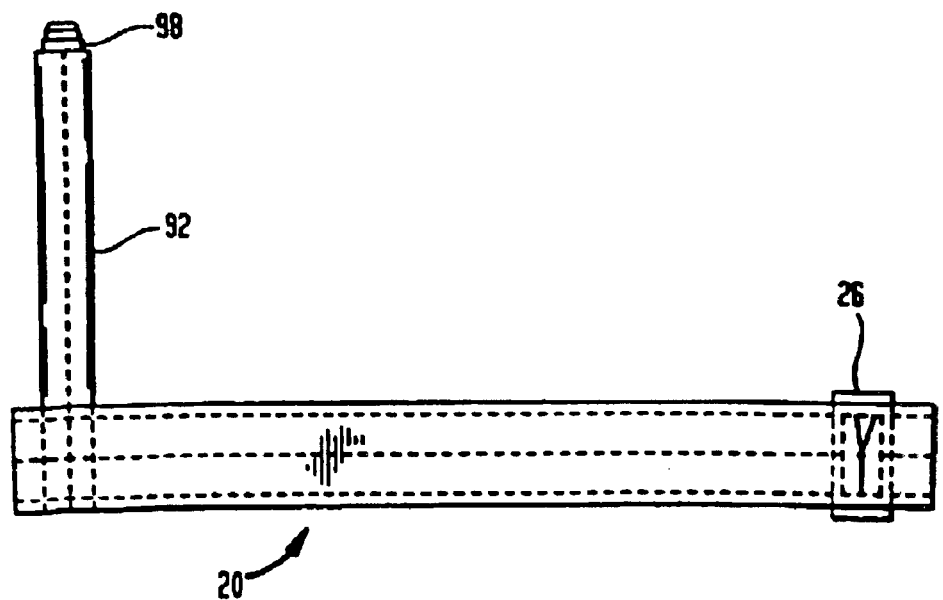
FIG. 7 illustrates a forearm extension of an extension arm, in accordance with the prior art.

FIGS. 11a–e illustrate several views of the lower channel 106, according to one embodiment of the invention. The U-shaped body 134 of the lower channel 106 comprises a channel bottom 190 from which extend two channel side walls 192. Unlike the lower channel 16 of the prior art extension arm shown in FIGS. 5a–b, which is stamped from heavy gauge steel, the channel bottom 190 and sidewalls 192 of the lower channel 106 are preferably integrally cast from zinc, which gives the lower channel 106 a lesser weight when compared to heavy gauge steel, and a degree of structural rigidity, more suitable for lighter-weight flat screen devices. At each end of the channel bottom 180 are the rollers 136, which are also integrally cast. The rollers 136 have a hole 194 therethrough (either cast or subsequently drilled) for receiving a connection mechanism, such as the pins 118. The channel bottom 190 additionally includes a cable channel aperture 196 running longitudinally. In the embodiment shown, the cable channel aperture 196 has rounded ends, which improves the rigidity of the lower channel 106. The cable channel aperture 196 is configured to receive a cable cover 198 (illustrated in FIG. 11e). The cable cover 198 is configured to removably fit within the cable channel aperture 196. Thus, cables of the mounted device may be substantially retained within the lower channel 106 so as to hide them from view and protect them from harm. The cable channel aperture 196 and the cable cover 198 enable cables to be accessed when desired, while securing them within the lower channel 106.

The lower channel 106 has numerous manufacturing advantages over the lower channel 16 of the prior art, and other like it. For instance, as described above with reference to the upper channel 104, the rollers 136 of the lower channel 106 of the present invention are integrally cast so as to insure that the axial centerlines of the rollers 136 are perfectly parallel to each other, and that the axial centerlines of the rollers 136 are perfectly perpendicular to a longitudinal centerline 200 of the channel bottom 2-90. Thus, the need for precision alignment of the rollers 84 prior to welding to the lower channel 16 is eliminated.

Additionally, and as also described with reference to the upper channel 104, the rollers 136 of the lower channel 106 are integrally cast so no welding is required. Thus, the cost of performing the welding and the cost of testing the rollers to determine if they are a suitable welding material is eliminated. Another advantage of eliminating the need for welding the rollers 136 to the lower channel 106 is reducing the likelihood of heat-deforming the lower channel 106 so that materials are not wasted.

Figure 11A:
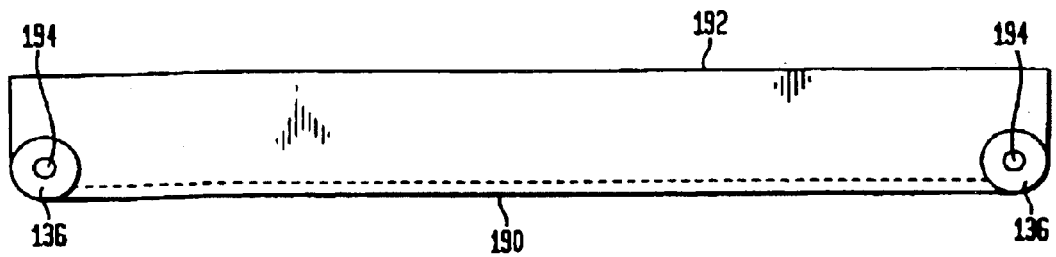
FIGS. 11(a)–(e) illustrate several views of a lower channel, according to one embodiment of the invention.
Figure 11B:
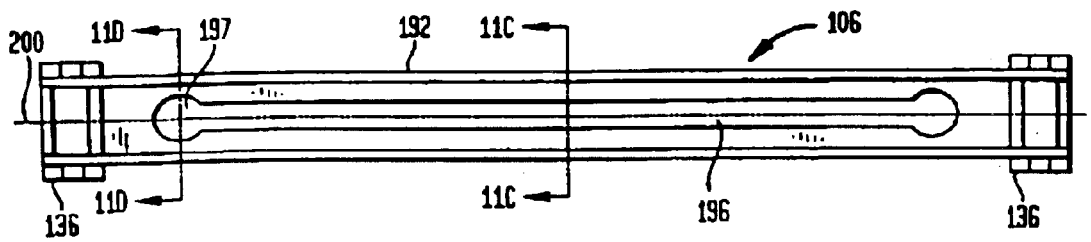
Figure 11C:
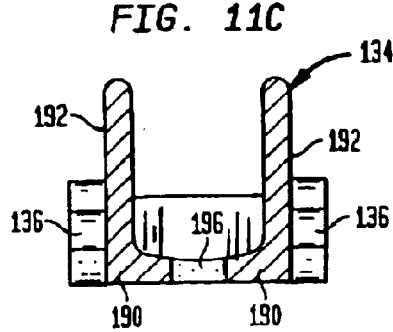
Figure 11D:
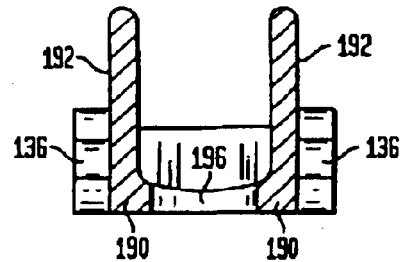

As shown in FIGS. 11c and 11d, which are cross-sectional views of the lower channel 106, the sidewalls 192 of the lower channel 106 are tapered. An outer surface of the sidewalls 192 is tappered approximately ½ degree while an inner surface is tappered approximately 1 degree. The taper is possible because the lower channel 106 is, in the preferred embodiment, cast molded. As rioted above with respect to the upper channel 104, the taper provides more clearance between the upper channel 104 and the lower channel 106 so as to reduce or eliminate the chance of the upper and the lower channels 104, 106 scraping. Moreover, less material is needed at outer edges of the sidewalls 192. A further advantage, as noted above with respect to the upper channel 104, is that the hole 194 within the rollers 136, according to one embodiment, is precision-drilled after an application of paint or other coatings, thus eliminating the expense of masking any openings.

Figure 11E:
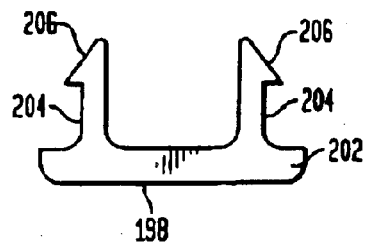

As illustrated in FIG. 11e, the cable cover 198 includes a top cover 202 with two sidewalls 204 pertruding therefrom. A far end of each sidewall 204 has a catch 206 formed thereon so as to engage with the cable channel aperature 196.

Forearm Extension 110

With reference to FIGS. 12a, 12b, 13a and 13b, the forearm extension 110 includes a body 140, which is preferably U-shaped so that a cable can be hidden therein, having female couplings 142, 144 disposed at each end. The V-shaped body 140 includes a topwall 207 and two side walls 208. The female coupling 142 has an inner diameter 209 that is sized to rotatably engage the shaft 114 of the second end cap 108. As illustrated in FIG. 8, the forearm extension 110 and the shaft 114 are securely fastened to each other by connecting a screw 211 through a coupling top 213 into a hole 215 (FIG. 9a) within the shaft 114.

A bushing 210 (FIG. 8) is preferably used to engage the female coupling 142 and the shaft 114. That is, the bushing 210 is placed over the shaft 114 and within the female coupling 142. The bushing 210 is preferably made of a smooth material, such as plastic, in order to reduce friction and prevent metal to metal contact. The female coupling 142 preferably has a set screw 212 formed within a wall 214 of the female coupling 142. The set screw 212 is aligned to press against the bushing 210 at approximately the location of a ridge 216 (see FIG. 9a) on the shaft 114 of the second end cap 108. When the set screw 212 is tightened it causes the bushing 210 to flex inward and frictionally engage the shaft 114 and thus prevent the forearm extension 110 from rotating about the shaft 114. Advantageously, the female coupling 142 has a plurality of voids 217 formed in the wall 214, which saves on material costs and permits the forearm extension 2-10, when cast, to be cooled more quickly. The quicker cooling enables the production quantity to be increased.

The female coupling 144 has an inner diameter 218 that is sized to rotatably engage a shaft of a device mount, such as a tilter, platform or other device used to secure flat-screen devices. A bushing 220 (FIG. 8), preferably made of a smooth material such as plastic, is placed over the shaft and within the female coupling 144. The female coupling 144 preferably has a set screw 222 formed within a wall 224 of the female coupling 144. When the set screw 222 is tightened it causes the bushing 220 to flex inward and frictionally engage the shaft and thus prevent the device mount from rotating around the female coupling 144. Advantageously, the female coupling 144 also has a plurality of voids 226 formed in the wall 224.

Figure 2:
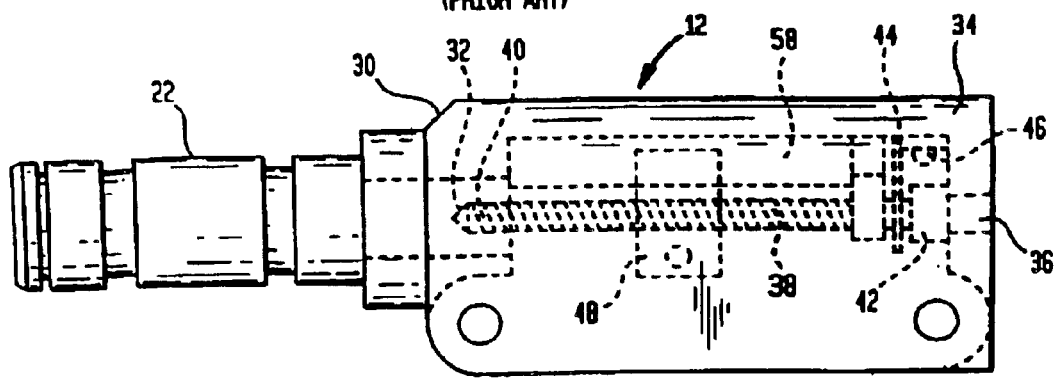
FIG. 2 illustrates a first end cap of an extension arm, in accordance with the prior art.
Figure 3:
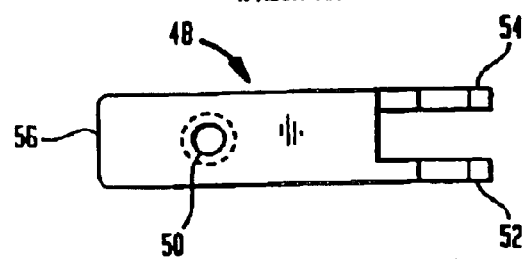
FIG. 3 illustrates the clevis assembly of an extension arm, in accordance with the prior art.
Figure 12A:
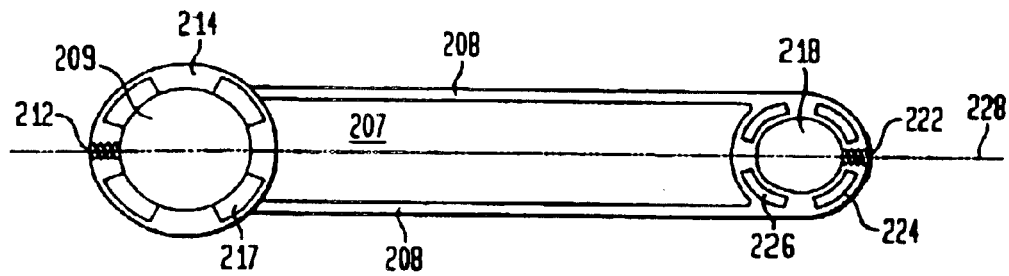
FIGS. 12(a) and 12(b) illustrate a forearm extension, in accordance with one embodiment of the invention.
Figure 12B:
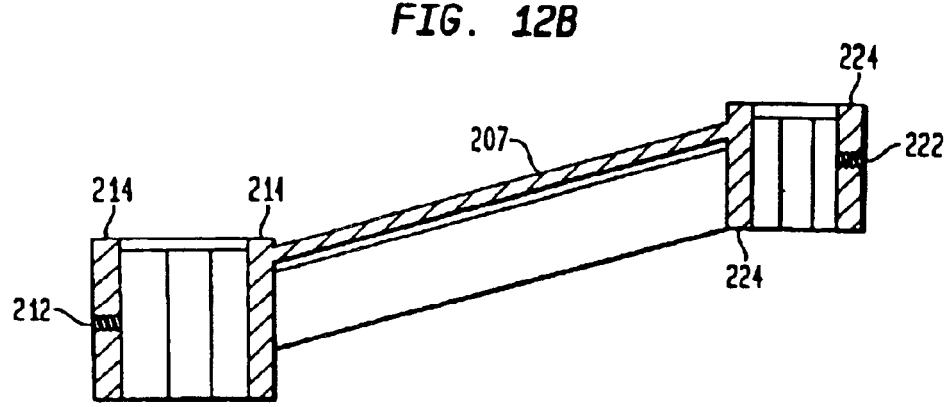

FIGS. 12a and 2-2b illustrate one embodiment of the forearm extension 110, wherein the center of the female couplings 142, 144 are aligned with a longitudinal centerline 228 of the body 140. As illustrated in FIG. 12b, when the axial centerlines of the female couplings 142, 144 are vertically disposed, the body 140 inclines at an angle, such as a 15 degree angle as specifically illustrated in FIG. 12b. It should be noted however that the incline angle is not limited to 15 degrees, and there may in fact be no incline at all in this embodiment.

Figure 13A:
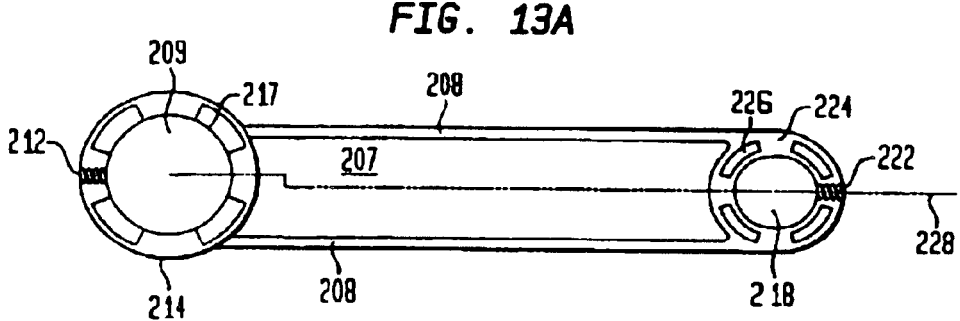
FIGS. 13(a) and 13(b) illustrate a forearm extension, in accordance with one embodiment of the invention.
Figure 13B:
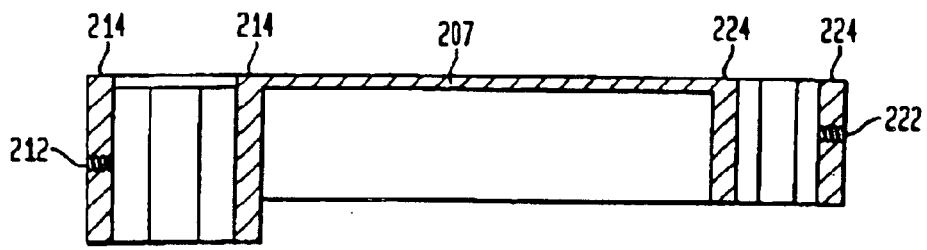

FIGS. 13a and 13b illustrate another embodiment of the forearm extension 110, wherein the center of the female couplings 142, 144 do not align with the axial centerline 228 of the body 140. Rather the body 140 is flush with an upper edge of the female coupling 142, resulting in the center of the female coupling 142 being offset from the center of the female coupling 144. As illustrated in FIG. 13b, when the axial centerlines of the female couplings 142, 144 are vertically disposed, the body 140 is horizontally disposed therebetween. It should be noted however that the body 140 is not limited to be horizontally disposed and may be disposed at an incline in this embodiment.

Extension Arm 100

In addition to improvements in manufacturing and assembly, the present invention also offers a functional interchangeability which is not present in the prior art. For instance, several forearm extensions 110 and/or extension arms 100 can be connected end-to-end to provide additional extension length or additional adjustability.

A dual purpose of flat-screen devices is to minimize the amount of space which they occupy while simultaneously being aesthetically pleasing to the eye. Thus, it is desirable that an extension arm for a flat-screen device be able to be mounted substantially flat to its mounting surface while hiding the extension arm behind it. The present invention permits a flat-screen device which is mounted to a wall to be flattened against the wall while hiding the extension arm 100 within the shadow of the device.

The prior art extension arms 10 did not allow this functionality. Referring to FIG. 1, if a wall is defined by the plane of the page, it can be seen that a device inserted into the hole 26 may be substantially flattened against the wall when the upper and the lower channels 14, 16 and the forearm extension 20 are flush against the wall. A flat-screen computer monitor, which is typically about 15 inches wide, will hide from view the forearm extension 20, but may leave exposed the parallelogram formed by the first end cap 12, the upper channel 14, the lower channel 16 and the second end cap 18. In order to hide the parallelogram, the forearm extension 20 needs to be rotated about the forearm extension pin 92 toward the first end cap 12. However, the upper and the lower channels 14, 16 and the first end cap 12 will prevent the forearm extension 20 from being flush against the wall in this configuration. Thus, it is clear that the prior art extension arms 10 could only provide the ability to mount a device~flush to the wall or the ability to mount a device so as to hide the forearm extension 20, but not both.

By contrast, the upper and the lower channels 104, 106 of the present invention do not interfere with the rotation of the forearm extension 110. That is, the forearm extension 110 may be folded into a position which is directly above the upper and the lower channels 104, 106. As a result, the mounted device is flush to the mounting surface and substantially hides the parallelogram, formed by the first and the second end caps 102, 108 and the upper and the lower channels 104, 106, as well as the forearm extension 110 from view. Thus, the aesthetic appeal of the extension arm 100 is increased and the space occupied by the extension arm 100 and the device is minimized.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

What is claimed is:

1. An end cap for use in an extension arm that adjustably mounts to a device to support a mount, said end cap comprising a partially enclosed housing including a first endwall having a hole, a second endwall and at least one sidewall; a shaft connected to said second endwall extending outwardly; and a pair of shelves disposed within said partially enclosed housing adjacent to said second endwall, said pair of shelves forming a groove therebetween, wherein said partially enclosed housing is adapted to receive a rod having a first end rotationally received within said hole in said first endwall and a second end rotationally received within said groove formed by said pair of shelves adjacent said second endwall.

2. The end cap of claim 1, wherein each of said shelves include a threaded screw hole formed therein.

3. The end cap of claim 1, further comprising at least one stop member located within said partially enclosed housing proximate to said first endwall and said second endwall.

4. The end cap of claim 1, wherein said at least one sidewall is semicircular in shape and connects to said first endwall and said second endwall.

5. The end cap of claim 1, further comprising a pair of trough walls formed within said partially enclosed housing, said pair of trough walls extending between said first endwall and said second endwall forming a trough therebetween.

6. The end cap of claim 5, further comprising a clevis having an end received within said trough and a rod in threaded engagement with said clevis, wherein said clevis is configured to slide within said trough when said rod rotates round an axial centerline of said rod.

7. The end cap of claim 6, wherein said rod includes a first end having a shaped opening, a shoulder adjacent to the first end, a threaded portion, and a second end.

8. The end cap of claim 7, wherein the first end of said rod is located within said hole provided in said first endwall, and said shoulder of said rod abuts an inner surface of said first endwall.

9. The end cap of claim 7, wherein the second end of said rod is rotatably secured within said groove and is retained in place by a retainer clip fastened to said shelves.

10. The end cap of claim 9, wherein said retainer clip is fastened to said pair of shelves by screws.

11. An end cap for use in an extension arm that adjustably mounts a device to a support mount, said end cap comprising a partially enclosed housing formed by a first endwall, a second endwall and at least one sidewall extending between said first and second endwalls; a shaft extending outwardly from said second endwall; a trough having a longitudinal length formed within said housing extending between said first and second endwalls; a threaded rod rotatably secured within said housing; a clevis having one portion received within said trough and another portion engaged by said rod, wherein rotation of said rod causes said clevis to move within said housing between said first and second endwalls; and at least one first stop member within said housing having a first end arranged inwardly of said first endwall and at least one second stop member within said housing having a second end arranged inwardly of said second endwall, wherein said first end of said at least one first stop member is spaced from said second end of said at least one second stop member within said housing by a distance smaller than the longitudinal length of said trough between said first and second endwalls.

12. The end cap of claim 11, wherein said sidewall has an opening extending between said first and second endwalls.

13. The end cap of claim 11, wherein said first endwall includes an opening adapted to receive one end of said rod.

14. The end cap of claim 13, further including a shelf having a groove within said housing adjacent said second endwall, wherein the other end of said rod is rotatable secured within said groove.

15. The end cap of claim 11, wherein said shaft and said rod each have a longitudinal axis arranged collinear with each other.

16. The end cap of claim 11, wherein said trough is formed from a pair of spaced apart trough walls extending between said first and second endwalls.

17. The end cap of claim 16, wherein said trough walls are integrally formed with said sidewall.

18. The end cap of claim 11, wherein said clevis includes a pair of spaced apart fastening members at one end thereof.

19. An end cap for use in an extension arm that adjustably mounts a device to a support mount, said end cap comprising a partially enclosed housing formed by a first endwall, a second endwall and at least one sidewall extending between said first and second endwalls; a shaft extending outwardly from said second endwall; a trough having a longitudinal length formed within said housing extending between said first and second endwalls; a threaded rod rotatably secured within said housing; a clevis having one portion received within said trough and another portion engaged by said rod, wherein rotation of said rod causes said clevis to move within said housing towards said first and second endwalls; and a first pair of projections extending inwardly opposing each other from said sidewall within said housing each having a first end arranged inwardly of said first endwall, and a second pair of projections extending inwardly opposing each other from said sidewall within said housing each having a second end arranged inwardly of said second endwall, wherein said first ends of said first pair of projections are spaced from said second ends of said second pair of projections within said housing by a distance smaller than the longitudinal length of said trough.

\* \* \* \* \*

UNITED STATES PATENT AND TRADEMARK OFFICE
CERTIFICATE OF CORRECTION

PATENT NO. : 6,955,328 B2
DATED : October 18, 2005
INVENTOR(S) : Odd N. Oddsen, Jr.

It is certified that error appears in the above-identified patent and that said Letters Patent is hereby corrected as shown below:

Column 1,
Line 49, "form" should read -- forms --.

Column 4,
Lines 16 and 27, after "invention", insert -- there is --.

Column 7,
Line 66, replace "are" with -- is --.

Column 8,
Line 63, replace "in" with -- is --.

Column 9,
Line 56, replace "in" with -- An --.

Column 10,
Line 14, "tapers" should read -- taper --.
Line 47, after "ball", delete "comma".

Column 11,
Line 32, "other" should read -- others --.
Line 52, "rioted" should read -- noted --.

Column 12,
Line 48, "are" should read -- is --.
Line 58, "do" should read -- does --.

UNITED STATES PATENT AND TRADEMARK OFFICE
CERTIFICATE OF CORRECTION

PATENT NO. : 6,955,328 B2
DATED : October 18, 2005
INVENTOR(S) : Odd N. Oddsen, Jr.

It is certified that error appears in the above-identified patent and that said Letters Patent is hereby corrected as shown below:

Column 14,
Line 2, "include" should read -- includes --.
Line 58, "rotatable" should read -- rotatably --.

Signed and Sealed this

Twenty-eighth Day of February, 2006

JON W. DUDAS
*Director of the United States Patent and Trademark Office*

(12) EX PARTE REEXAMINATION CERTIFICATE (6278th)
United States Patent
Oddsen, Jr.

(10) Number: US 6,955,328 C1
(45) Certificate Issued: Jun. 24, 2008

(54) ARM APPARATUS FOR MOUNTING ELECTRONIC DEVICES

(75) Inventor: Odd N. Oddsen, Jr., Easton, PA (US)

(73) Assignee: Innovative Office Products, Inc., Easton, PA (US)

Reexamination Request:
No. 90/008,664, May 25, 2007

Reexamination Certificate for:
Patent No.: 6,955,328
Issued: Oct. 18, 2005
Appl. No.: 10/305,510
Filed: Nov. 27, 2002

Certificate of Correction issued Feb. 28, 2006.

Related U.S. Application Data

(62) Division of application No. 10/166,419, filed on Jun. 10, 2002, now Pat. No. 6,854,698, which is a continuation of application No. 09/405,628, filed on Sep. 24, 1999, now Pat. No. 6,478,274

(60) Provisional application No. 60/133,378, filed on May 10, 1999.

(51) Int. Cl.
*E04G 3/00* (2006.01)

(52) U.S. Cl. ............... 248/282.1; 248/289.11; 403/300; 403/306

(58) Field of Classification Search ........... 248/28.1, 248/289.11; 403/300, 306
See application file for complete search history.

(56) References Cited

U.S. PATENT DOCUMENTS 5,842,672 A   12/1998   Sweere et al. ............ 248/278.1

*Primary Examiner*—Matthew C. Graham

(57) ABSTRACT

An extension arm suitable for mounting a flat-screen electronic peripheral device, including a forearm extension having at one end a first coupling for attachment to a tilter, a platform or other means for supporting a flat-screen device and at the other end a second coupling. The extension arm also includes a pair of end caps, each having a shaft. The shaft of the first end cap is pivotably rotatable in a support mount, such as a wall, desk or pole mount. The shaft of the second end cap is pivotably rotatable in the second coupling of the forearm extension. The extension arm also includes an upper channel and a lower channel. Each channel has at opposite ends a pair of integrally cast rollers which are pivotably attached to each of the end caps. The upper and lower channels and the end caps form an adjustable parallelogram.

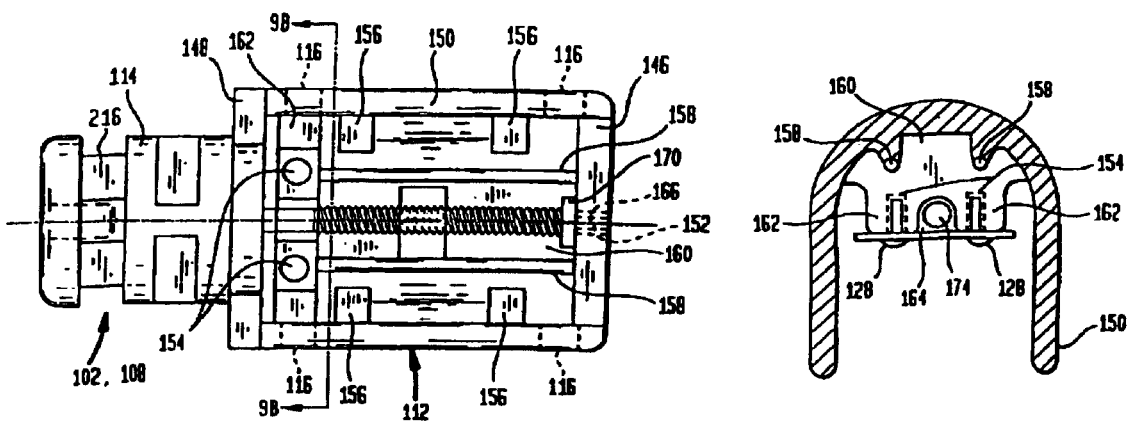

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 19 is determined to be patentable as amended.

New claim 20 is added and determined to be patentable.

Claims 1–18 were not reexamined.

19. An end cap for use in an extension arm that adjustably mounts a device to a support mount, said end cap comprising a partially enclosed housing formed by a first endwall, a second endwall and at least one sidewall extending between said first and second endwalls, *said housing having a longitudinal axis extending between said first and second endwalls*; a shaft extending outwardly from said second endwall; a trough having a longitudinal length formed within said housing extending between said first and second endwalls; a threaded rod rotatably secured within said housing; a clevis having one portion received within said trough and another portion engaged by said rod, wherein rotation of said rod causes said clevis to move within said housing towards said first and second endwalls; and a first pair of projections extending inwardly opposing each other from said sidewall within said housing each having a first end arranged inwardly of said first endwall, and a second pair of projections extending inwardly opposing each other from said sidewall within said housing each having a second end arranged inwardly of said second endwall, *said first pair of projections spaced longitudinally apart from said second pair of projections along said longitudinal axis of said housing*, wherein said first ends of said first pair of projections are spaced from said second ends of said second pair of projections within said housing by a distance smaller than the longitudinal length of said trough.

*20. An end cap for use in an extension arm that adjustably mounts a device to a support mount, said end cap comprising a partially enclosed housing formed by a first endwall, a second endwall and at least one sidewall extending between said first and second endwalls; a shaft extending outwardly from said second endwall; a trough having a longitudinal length formed within said housing extending between said first and second endwalls; a threaded rod rotatably secured within said housing; a clevis having one portion received within said trough and another portion engaged by said rod, wherein rotation of said rod causes said clevis to move within said housing towards said first and second endwalls; and a first pair of projections integrally molded with said sidewall, said first pair of projections extending inwardly opposing each other from said sidewall within said housing each having a first end arranged inwardly of said first endwall, and a second pair of projections integrally molded with said sidewall, said second pair of projections extending inwardly opposing each other from said sidewall within said housing each having a second end arranged inwardly of said second endwall, wherein said first ends of said first pair of projections are spaced from said second ends of said second pair of projections within said housing by a distance smaller than the longitudinal length of said trough.*

\* \* \* \* \*